United States Patent [19]

Miyahara

[11] 4,351,427
[45] Sep. 28, 1982

[54] CLUTCH RELEASE BEARING ASSEMBLY PROVIDED WITH A SELF-CENTERING MECHANISM

[75] Inventor: Takashi Miyahara, Yokohama, Japan

[73] Assignee: Nippon Seiko Kabushiki Kaisha, Tokyo, Japan

[21] Appl. No.: 132,178

[22] Filed: Mar. 20, 1980

[30] Foreign Application Priority Data

Apr. 10, 1979 [JP] Japan .................. 54-42511

[51] Int. Cl.³ .............................................. F16D 23/14
[52] U.S. Cl. ................................. 192/98; 192/110 B; 308/233
[58] Field of Search ............... 192/98, 110 B; 308/233

[56] References Cited

U.S. PATENT DOCUMENTS

| | | | |
|---|---|---|---|
| 3,390,927 | 7/1968 | Adams | 308/233 X |
| 3,416,637 | 12/1968 | Maurice | 192/98 |
| 3,625,327 | 12/1971 | Birdsey | 192/98 X |
| 3,882,979 | 5/1975 | Limbacher et al. | 192/98 |
| 3,921,775 | 11/1975 | Matyschik | 192/98 |
| 3,921,776 | 11/1975 | Sonnerat | 192/98 |
| 3,985,215 | 10/1976 | Ernst et al. | 192/98 |
| 4,026,398 | 5/1977 | Matyschik et al. | 192/98 |
| 4,077,504 | 3/1978 | Ernst et al. | 192/98 |
| 4,117,916 | 10/1978 | Baker | |
| 4,228,881 | 10/1980 | Nakamura | 192/98 |

*Primary Examiner*—Rodney H. Bonck
*Attorney, Agent, or Firm*—Wyatt, Gerber, Shoup, Scobey & Badie

[57] ABSTRACT

A clutch release bearing assembly provided with a self-centering mechanism has a clutch releasing bearing device and bearing device holding means movable axially of a clutch by clutch operating means and holding the bearing device for self-centering. The bearing device holding means has a metallic portion and a synthetic resin portion formed integrally with the metallic portion. The metallic portion constitutes a drum-like base.

3 Claims, 8 Drawing Figures

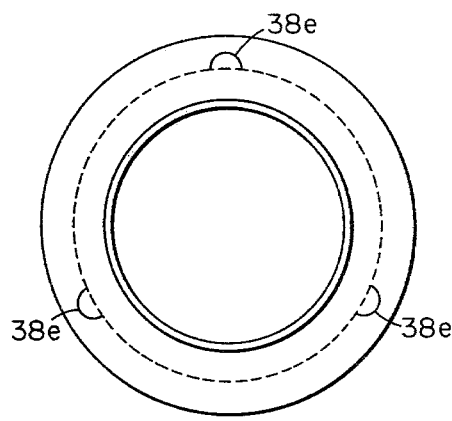
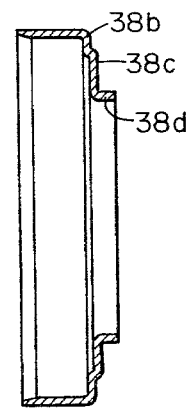
FIG. 3　　　　　FIG. 4
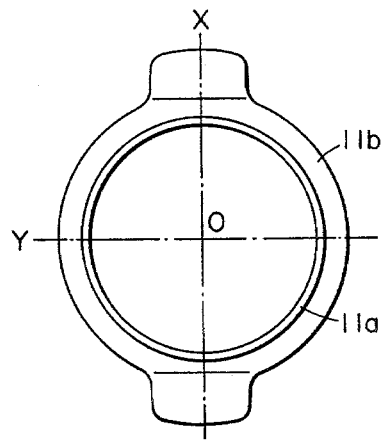
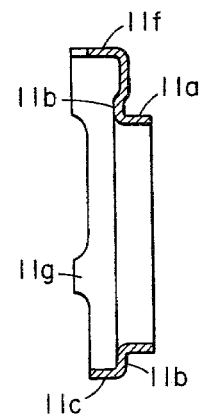
FIG. 5　　　　　FIG. 6
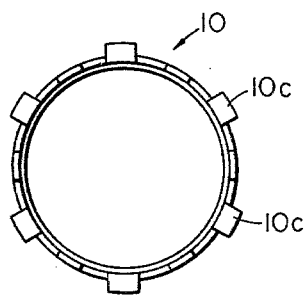
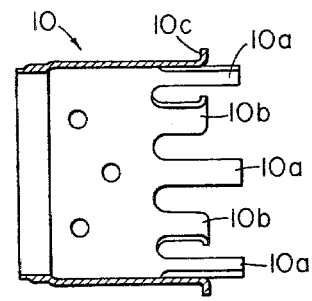
FIG. 7　　　　　FIG. 8

CLUTCH RELEASE BEARING ASSEMBLY PROVIDED WITH A SELF-CENTERING MECHANISM

BACKGROUND OF THE INVENTION

1. Field of the Invention

This invention relates to a clutch release device provided with a self-centering mechanism.

2. Description of the Prior Art

Various clutch release devices of the self-centering type have been proposed which have a clutch releasing bearing device and bearing holding means slidable axially of the clutch by clutch operating means. The clutch releasing bearing device is held in a self-centering manner, namely, it may move in a direction substantially perpendicular to the clutch axis and/or may tilt with respect to the axial direction of the clutch, as disclosed in U.S. Pat. No. 3,416,637 granted to J. Maurice.

Since the clutch release devices of this type are provided with a self-centering mechanism, they are all the more increased in weight and number of parts and high in manufacturing cost. In the present-day automobile industry, light weight and reduced cost of automobiles are strongly desired.

SUMMARY OF THE INVENTION

It is therefore an object of the present invention to provide a clutch release device which is light in weight and small in number of parts and further, prevents abrasion of the front cover and prevents occurrence of strange sounds.

According to the present invention, there is provided a clutch release device provided with a self-centering mechanism and having a clutch releasing bearing device and bearing device holding means slidable axially of a clutch by clutch operating means and holding said bearing device for self-centering, said bearing device holding means having a metallic member and a synthetic resin member formed integrally therewith, said metallic member including a cylindrical base and a flange-like portion for receiving the operating force from said clutch operating means.

The invention will become fully apparent from the following detailed description of a preferred embodiment thereof taken in conjunction with the accompanying drawings.

Figures 1, 2:
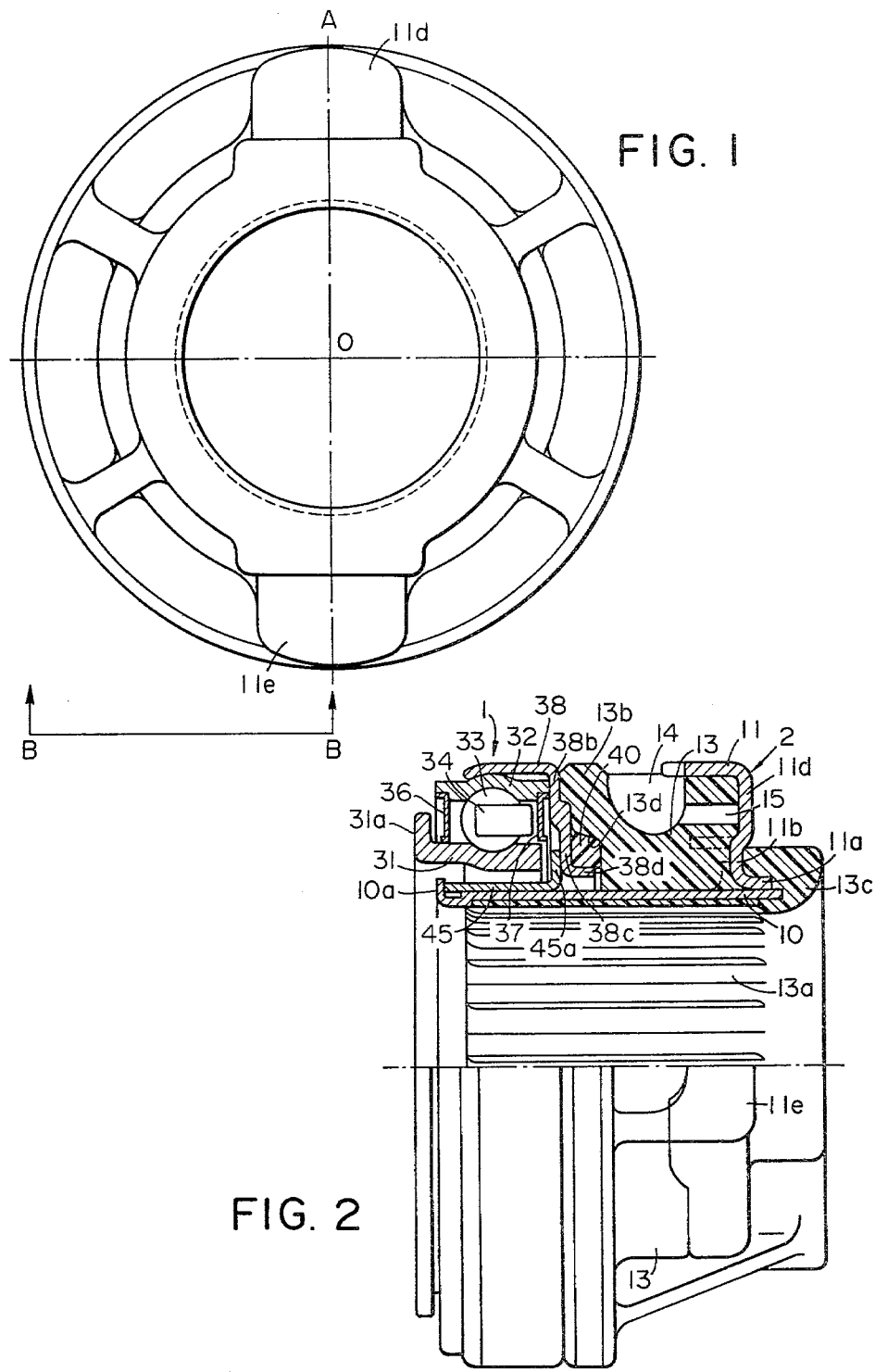
FIG. 1 is a front view of an embodiment of the present invention.

The upper half of FIG. 2 is a cross-sectional view taken along line O-A in FIG. 1, and the lower half of FIG. 2 is a view as seen in the direction of arrow B—B in FIG. 1.

FIG. 3 is a front view showing only a bearing supporting cover member on a reduced scale.

FIG. 4 is a cross-sectional view taken along the center of FIG. 3.

FIG. 5 is a front view showing a flange-like member on the same reduced scale as FIG. 3.

FIG. 6 is a cross-sectional view taken along line X-O-Y in FIG. 5.

FIG. 7 is a view similar to FIG. 5 but showing a cylindrical base member.

FIG. 8 is a cross-sectional view taken along the center of FIG. 7.

DESCRIPTION OF THE PREFERRED EMBODIMENT

As shown in FIG. 2, a clutch release device includes a bearing device 1 and bearing device holding means 2 for holding the bearing device for self-centering movement in a manner to be described.

The bearing device holding means 2 comprises a metal member formed of one or more parts and a hard synthetic resin member secured integrally therewith to form a unit. The metal includes a cylindrical base member 10 and a flange-like member 11. The cylindrical base member 10 and the flange-like member 11 are shown as discrete members, but they may be formed integrally with each other. The cylindrical base member 10, as shown in FIG. 2, extends axially of a clutch. FIGS. 7 and 8 show only this cylindrical base member 10 on a somewhat reduced scale and, as shown in the right portion of FIGS. 2 and 8, the cylindrical member has comb-like protrusions 10a and 10b, of which the protrusions 10b have the ends 10c thereof somewhat bent radially outwardly. The protrusions 10a are longer than the protrusions 10b as shown in FIG. 8.

In FIGS. 5 and 6, only the flange-like member 11 is shown on a somewhat reduced scale as compared with FIGS. 1 and 2. The inside diameter of the flange-like member is of a dimension conforming to the outside diameter of the cylindrical base member 10, and the inside diameter cylindrical portion 11a thereof is fitted to the extension 10a of the cylindrical member, and a flange portion 11b rising continuously from the cylindrical portion 11a is in engagement with the bent ends 10c of the protrusions 10b. The flange-like member 11 has a bent portion 11c extending substantially over the entire periphery thereof at the outside diameter end of the flange portion 11b, and this bent portion 11c extends inwardly of the clutch in the axial direction thereof, namely, in the opposite direction to the cylindrical portion 11a. As shown in FIG. 1, the flange-like member has engaging portions 11d and 11e projected radially at the upper and lower ends thereof which are adapted to be engaged by the fork member of the clutch operating means (the clutch operating means itself is well-known and therefore not shown). Each of the engaging portions 11d and 11e has a substantially rectangular outline, and the engaging portions form axial portions 11f and 11g continuous to said portion 11c.

A hard synthetic resin insert 13 is molded and secured to the cylindrical member 10 and the flange-like member 11 and combines these elements together, except for a portion thereof to be described. The synthetic resin insert 13 has an inside diameter wall portion 13a covering the inside diameter side of the cylindrical member 10 except for the left end portion thereof as shown in FIG. 1, and the inside diameter wall portion 13a is fitted slidably axially of a retainer (not shown) projectedly fixed to the front of the case of a transmission device and is formed with an axial groove serving as a grease reservoir for providing good lubrication or taking into account any dimensional variation during the formation or any abrasion during the sliding. Since the retainer fixed to the transmission case now typically is being formed of aluminum alloy, forming the insert 13 of resin can avoid the nibbling which would otherwise occur in the case of the conventional casting and the occurrence of vibration sounds which would result therefrom. On the outer periphery of the cylindrical base member 10, the synthetic resin insert 13 is molded and secured to substantially the same height as the flange portion 11b from the inside (the left side in FIG. 2) of the flange-like member 11 to substantially the central portion of the member 10. The synthetic resin insert 13 is projected radially outwards to follow the engaging portions 11d and 11e, and forms, on the bearing supporting side, a portion 13b equal in height to this projected portion over the entire periphery thereof and, in FIG. 2, the left end surface thereof forms a bearing supporting surface. In the projected portion of the synthetic resin insert 13 conforming to the engaging portions 11d and 11e, a depression 14 is formed from the outer periphery side and, in the lower portion thereof, there is provided an axial bore 15 leading to the engaging portions 11d and 11e, and a wire spring (not shown) for causing a clutch fork to engage is inserted in the axial bore 15.

Synthetic resin insert 13c is formed integrally with the right end portion of the bearing holding means 2 as viewed in FIG. 2, except for the bearing operating fork receiving surfaces of the engaging portions 11d and 11e. That is, the left part (FIG. 2) of the inside diameter side portion 11b of the cylindrical base member 10 and the flange-like member 11 is covered with the synthetic resin 13c and only the engaging portions 11d and 11e are exposed.

The bearing of the clutch release bearing device 1 is of the inner race rotating type in which the inner race rotates when it contacts a clutch diaphragm, not shown, and a contact portion 31a is integrally provided to the inner race 31 which is a rotating race. An outer race 32 is formed as a fixed race, and a ball 33 and a cage 34 are interposed between the outer race 32 and the inner race 31. The outer race 32 is provided with seals 36 and 37. A bearing supporting cover member 38 supporting the bearing 1 by securely holding the outer race 32 from the outer periphery side thereof is radially inwardly bent at the right end (transmission side) of the outer race in FIG. 2 to form a radial flat portion 38b which substantially contacts the bearing supporting flat portion of the portion 13b of the aforementioned synthetic resin insert 13. Continuously to this flat portion 38b and on the inside diameter side thereof, the bearing supporting cover member 38 is bent away from the outer race 38 to form a second radial flat portion 38c. Continuously to this flat portion 38c, the inside diameter side end portion of the bearing supporting cover member forms a cylindrical portion 38d extending toward the synthetic resin insert 13. Between the portions 38c, 38d and the wall surface of an annular recess 13d of the synthetic resin insert 13 formed in opposed relationship with these portions, there is formed an annular chamber of substantially square cross section, and a plastically deformable member or an elastically deformable member 40 is disposed in the annular chamber. The inside diameter of the cylindrical portion 38d which is the inside diameter end portion of the bearing supporting cover member 38 is greater than the outside diameter of the cylindrical base member 10 of the bearing device holding means which is opposed thereto, and the bearing device supported by the bearing supporting cover member 38 and including the cover member is slightly movable radially relative to the bearing device holding means 2. To have the bearing device 1 so held by the bearing device holding means 2, the outer periphery of the cylindrical base member 10 of the bearing device holding means 2 is exposed in the inside portion of the bearing device, and a metallic support and guide member 45 is fitted thereto and caulked by the end 10a of the cylindrical member 10 and secured to the cylindrical member. The radial rising portion 45a of the support and guide member 45 is in proximity to or in contact with the second radial flat portion 38c of the bearing supporting cover member to hold the bearing device 1 for movement in a direction substantially perpendicular to the clutch axis relative to the bearing device holding means and against movement in the direction of the clutch axis.

Further, a suitable member of recesses are provided preferably on that side of the portion 13b of the synthetic resin insert 13 which is adjacent to the bearing, and projections 38e opposed to those recesses are formed on the flat portion 38b of the bearing supporting cover member 38 to prevent relative rotation of the bearing device holding means 2 and the bearing device 1.

With such a construction, where the center axis of the bearing device 1 is eccentric relative to the clutch axis, the inner race of the bearing device 1 bears against the clutch diaphragm and rotates, whereby the bearing device is self-centered.

According to the present invention, the bearing device holding means is formed of synthetic resin and a metallic member and therefore, the weight and manufacturing cost thereof can be remarkably reduced as compared with the conventional bearing device holding means formed of metal only.

Also, according to the present invention, an axial groove can be formed in the inside diameter of the bearing device holding means, so that the nibbling to the retainer fixed to the transmission case and the occurrence of vibration sound can be avoided more effectively.

In the foregoing, an embodiment in which self-centering is effected by deformation of a plastically deformable member or an elastically deformable member has been shown by way of example, whereas the bearing device holding means of the present invention is also usable with a device provided with other known self-centering mechanism or a device provided with a self-centering mechanism for self-centering the inclination of the center line of the bearing with respect to the clutch axis. Also, the embodiment has been disclosed with respect to the inner race rotation type, whereas the present invention can equally be carried out with respect to the outer race rotation type, and the bearing supporting cover and the support and guide member of the bearing device holding means may alternatively be formed of synthetic resin.

I claim:

1. In a clutch release bearing assembly of the self-centering type usable with a clutch and comprising a clutch release bearing device, holding means movable axially of the clutch for holding said bearing device and movable in a direction perpendicular to the axial direction of the clutch for centering the bearing device, and a plastic deformation member disposed in the path of the thrust force between the holding means and the bearing device, the improvement comprising said holding means including a base portion formed of metal and having a cylindrical base, and an insert portion formed of a hard synthetic resin and secured integrally with said base portion, wherein the bearing device includes a rotatable race, a stationary race, rollers between both the races and a supporting member securely holding the stationary race, the supporting member having a radially extended portion adapted to form between the radially extended portion and the synthetic resin portion a chamber receiving the plastic deformation member, and the holding means includes a further metallic guide member held in contact with said radially extended portion to support the bearing device movably in a direction perpendicular to the axial direction of the clutch.

2. In a clutch release bearing assembly of the self-centering type usable with a clutch and comprising a clutch release bearing device, holding means movable axially of the clutch for holding said bearing device and movable in a direction perpendicular to the axial direction of the clutch for centering the bearing device, and a plastic deformation member disposed in the path of the thrust force between the holding means and the bearing device, the improvement comprising said holding means including a base portion formed of metal and having a cylindrical base, and an insert portion formed of a hard synthetic resin and secured integrally with said base portion, said insert portion having an inside portion underlying said base portion, said inside portion being adapted to fit upon a retainer and having at least one axial groove serving as a grease reservoir.

3. A clutch release bearing assembly according to claim 1 or 2, wherein said holding means further includes a metallic member having a radially extended portion adapted to be engaged with a clutch actuating member.

* * * * *